(12) United States Patent
Jones et al.

(10) Patent No.: US 10,514,827 B2
(45) Date of Patent: Dec. 24, 2019

(54) RESEQUENCING ACTIONABLE TASK STRUCTURES FOR TRANSFORMING DATA

(71) Applicant: MICROSOFT TECHNOLOGY LICENSING, LLC, Redmond, WA (US)

(72) Inventors: Taurean Addair Jones, Issaquah, WA (US); Chairy Chiu Ying Cheung, Redmond, WA (US); Jose Ramon Calzada Gomez, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 15/430,358

(22) Filed: Feb. 10, 2017

(65) Prior Publication Data

US 2018/0232111 A1 Aug. 16, 2018

(51) Int. Cl.
| | | |
|---|---|---|
| *G06F 3/0482* | (2013.01) | |
| *G06F 16/25* | (2019.01) | |
| *G06F 3/0486* | (2013.01) | |
| *G06F 17/27* | (2006.01) | |

(52) U.S. Cl.
CPC .......... *G06F 3/0482* (2013.01); *G06F 16/258* (2019.01); *G06F 3/0486* (2013.01); *G06F 17/2705* (2013.01)

(58) Field of Classification Search
CPC .. G06F 3/048–04897; G06F 2203/048–04809; G06F 17/30657; G06F 17/2705; G06F 17/3064; G06F 17/30696; G06F 11/3664–3668; G06F 8/34; G06F 9/4446; G06F 15/0266; G06F 17/24; G06F 17/243; G06F 17/246; G06F 2203/04803–04805; H04L 41/22; H04L 12/282; H04L 67/025; B60H 1/00; G11B 19/025; G11B 19/027; G05B 19/418;
(Continued)

(56) References Cited

U.S. PATENT DOCUMENTS

| | | | |
|---|---|---|---|
| 5,701,400 A | 12/1997 | Amado | |
| 5,963,939 A * | 10/1999 | McCann | ............... G06Q 30/06 |
| 6,026,388 A | 2/2000 | Liddy et al. | |

(Continued)

FOREIGN PATENT DOCUMENTS

EP 2290562 3/2011

OTHER PUBLICATIONS

U.S. Appl. No. 15/430,346, filed Feb. 10, 2017, Cheung et al.
(Continued)

*Primary Examiner* — Kieu D Vu
*Assistant Examiner* — Alvaro R Calderon, IV
(74) *Attorney, Agent, or Firm* — Workman Nydegger

(57) ABSTRACT

Methods, systems and computer program products that are provided for resequencing actionable task structures include features for detecting and reflecting compatibility issues of discrete tasks in the actionable task structures. After receiving input for resequencing an actionable task structure, attributes associated with the resequenced tasks are accessed and analyzed. Compatibility is determined and reflected in the display of the task identifiers, with one or more visual identifiers. The visual indicators can also be used to reflect suggested changes to the actionable task structure, based on a comparison of the task attributes.

20 Claims, 10 Drawing Sheets

(58) Field of Classification Search
CPC ...... G09B 5/06; H04N 1/00437; G06Q 10/06; G06Q 10/109
See application file for complete search history.

(56) References Cited

U.S. PATENT DOCUMENTS

| | | | |
|---|---|---|---|
| 6,381,580 B1* | 4/2002 | Levinson | G06Q 10/06311 705/7.13 |
| 6,633,885 B1 | 10/2003 | Agrawal et al. | |
| 6,795,868 B1* | 9/2004 | Dingman | G06F 16/258 709/246 |
| 6,836,773 B2 | 12/2004 | Tamayo et al. | |
| 6,915,308 B1 | 7/2005 | Evans et al. | |
| 7,039,865 B1 | 5/2006 | Hersh | |
| 7,168,035 B1* | 1/2007 | Bell | G06F 17/2247 715/234 |
| 7,225,199 B1 | 5/2007 | Green et al. | |
| 7,305,614 B2 | 12/2007 | Chen et al. | |
| 7,461,059 B2 | 12/2008 | Richardson et al. | |
| 7,640,254 B2 | 12/2009 | McConnell | |
| 7,873,153 B2* | 1/2011 | Bukovec | G06Q 10/06 379/220.01 |
| 8,170,897 B1* | 5/2012 | Cohen | G06Q 10/06 705/7.13 |
| 8,195,641 B2 | 6/2012 | Rucker et al. | |
| 8,438,177 B2 | 5/2013 | Paulsen et al. | |
| 8,447,775 B2 | 5/2013 | Vronay et al. | |
| 9,424,068 B2 | 8/2016 | Lin et al. | |
| 9,767,201 B2 | 9/2017 | Pantel et al. | |
| 9,934,306 B2 | 4/2018 | Subramanian et al. | |
| 2003/0040850 A1 | 2/2003 | Najmi et al. | |
| 2004/0230572 A1 | 11/2004 | Omoigui | |
| 2005/0102284 A1 | 5/2005 | Srinivasan et al. | |
| 2005/0288920 A1* | 12/2005 | Green | G06F 17/2785 704/3 |
| 2005/0289168 A1* | 12/2005 | Green | G06F 16/951 |
| 2006/0136280 A1 | 6/2006 | Cho et al. | |
| 2009/0106684 A1 | 4/2009 | Chakra et al. | |
| 2009/0150388 A1 | 6/2009 | Roseman et al. | |
| 2009/0171720 A1* | 7/2009 | Crook | G06Q 10/04 705/35 |
| 2011/0320433 A1 | 12/2011 | Mohiuddin et al. | |
| 2012/0059842 A1* | 3/2012 | Hille-Doering | G06F 16/3322 707/769 |
| 2012/0265779 A1 | 10/2012 | Hsu et al. | |
| 2013/0006689 A1* | 1/2013 | Kinnear | G06Q 10/06 705/7.16 |
| 2013/0275429 A1 | 10/2013 | York et al. | |
| 2014/0282188 A1 | 9/2014 | Hathaway et al. | |
| 2015/0324346 A1* | 11/2015 | Sankaran | G06F 16/2456 715/212 |
| 2016/0055205 A1 | 2/2016 | Jonathan et al. | |
| 2016/0092475 A1 | 3/2016 | Stojanovic et al. | |
| 2016/0224624 A1* | 8/2016 | Robichaud | G06F 16/242 |
| 2016/0231915 A1 | 8/2016 | Nhan et al. | |
| 2016/0364382 A1 | 12/2016 | Sarikaya | |
| 2016/0371288 A1* | 12/2016 | Le Biannic | G06F 16/90328 |
| 2016/0371395 A1 | 12/2016 | Dumant et al. | |
| 2017/0090893 A1* | 3/2017 | Aditya | G06F 8/34 |
| 2017/0315796 A1* | 11/2017 | Melnik | G06F 16/16 |
| 2017/0364568 A1* | 12/2017 | Reynolds | G06F 3/0482 |
| 2017/0371881 A1* | 12/2017 | Reynolds | G06F 9/54 |
| 2018/0074786 A1* | 3/2018 | Oberbreckling | G06F 7/02 |
| 2018/0075104 A1* | 3/2018 | Oberbreckling | G06F 16/254 |
| 2018/0075115 A1* | 3/2018 | Murray | G06F 16/2456 |
| 2018/0129369 A1* | 5/2018 | Kim | G06F 3/0482 |
| 2018/0165604 A1* | 6/2018 | Minkin | G06Q 10/06 |
| 2018/0210936 A1* | 7/2018 | Reynolds | G06F 16/215 |
| 2018/0233141 A1* | 8/2018 | Solomon | G06N 20/00 |
| 2018/0246896 A1 | 8/2018 | Bailey et al. | |
| 2018/0314751 A1* | 11/2018 | Filippi | G06F 16/283 |

OTHER PUBLICATIONS

U.S. Appl. No. 15/430,369, filed Feb. 10, 2017, Gomez et al.
"Relational Query Designer User Interface (Report Builder)", Retrieved on: Aug. 16, 2016 Available at: https://msdn.microsoft.com/en-us/library/dd220607.aspx.
Schweickert, et al., "A Graphical User Interface to the Object-Oriented Database System Vodak on the Basis of the Generic Visualisation Toolkit Lyberworld", In Proceedings of the 3rd Workshop on Interfaces to Databases, Jul. 8, 1996, 12 pages.
"Non Final Office Action Issued in U.S. Appl. No. 15/430,346", dated Feb. 1, 2019, 35 Pages. MS# 400306-US-NP).
"Non Final Office Action Issued in U.S. Appl. No. 15/430,369", dated Mar. 8, 2019, 23 Pages. MS# 400788-US-NP).
Maglio, et al., "Intermediaries personalize information streams", In Communications of the ACM, vol. 43, Issue 8, Aug. 2000, 6 Pages.
Rodiger, et al., "RKWard: A Comprehensive Graphical User Interface and Integrated Development Environment for Statistical Analysis with R", In Journal of Statistical Software, Jun. 30, 2012, 34 Pages.

* cited by examiner

Key Term Index 410

| Task Name/Identifier 412 | Symantic Terms 414 | Syntactic Terms 416 |
|---|---|---|
| ~ | ~ | ~ |
| ~ | ~ | ~ |
| ~ | ~ | ~ |
| ~ | ~ | ~ |

Data Set Attribute Index 420

| Type 422 | Dependencies 424 |
|---|---|
| ~ | ~ |
| ~ | ~ |
| ~ | ~ |
| ~ | ~ |

Transform Dictionary 430

| Task Name/Type 432 | Effect Terms 434 | Inputs 436 | Outputs 438 | Transform Code/Pointer 440 | Dependency 442 | Priority 444 |
|---|---|---|---|---|---|---|
| ~ | ~ | ~ | ~ | ~ | ~ | ~ |
| ~ | ~ | ~ | ~ | ~ | ~ | ~ |
| ~ | ~ | ~ | ~ | ~ | ~ | ~ |
| ~ | ~ | ~ | ~ | ~ | ~ | ~ |

| Task1 | Effect | Input(s) | Output(s) | Transform Code/Pointer | Dependency | Priority |
|---|---|---|---|---|---|---|
| Task2 | Effect | Input(s) | Output(s) | Transform Code/Pointer | Dependency | Priority |
| Task3 | Effect | Input(s) | Output(s) | Transform Code/Pointer | Dependency | Priority |

RESEQUENCING ACTIONABLE TASK STRUCTURES FOR TRANSFORMING DATA

CROSS-REFERENCE TO RELATED APPLICATIONS

This application is related to U.S. patent application Ser. No. 15/430,346 filed on Feb. 10, 2017, entitled "INTERFACES AND METHODS FOR GENERATING AND APPLYING ACTIONABLE TASK STRUCTURES," and U.S. patent application Ser. No. 15/430,369 filed on Feb. 10, 2017, entitled "APPLICATION OF ACTIONABLE TASK STRUCTURES TO DISPARATE DATA SETS FOR TRANSFORMING DATA IN THE DISPARATE DATA SETS," both of which applications are incorporated herein by reference in their entirety.

BACKGROUND

Data management interfaces and tools have been developed to help data scientists analyze data. For instance, graphing tools can be used to visually represent underlying data that is stored in a variety of formats and locations.

Some data sets are very complex and/or contain errors. These complexities and inconsistencies can make it difficult to intuitively process and understand the correlations that exist between the underlying data. Accordingly, it is sometimes necessary to transform the data into a more unified and comprehensible form before it can be properly analyzed.

Data scientists transform the data with tasks, which are also referred to as transforms or data transforms. Some tasks include simple data transforms, such as the multiplication or addition of the data. Other tasks are more complicated. For instance, some tasks are used to parse, split, normalize, merge, reformat and/or perform other complex transformations on the data.

It is common for transformation pipelines to be used to process complex data sets. These transformation pipelines include a plurality of tasks that are sequenced for execution in a predetermined order. Many of the tasks are dependent upon the particular attributes and types of data being transformed, as well as the outputs and attributes of related tasks in the transformation pipeline.

During the initial assembly of the transformation pipeline and/or during subsequent analysis of the transformation pipeline, a data scientist might modify the transformation pipeline to change the functionality and/or efficiency of the transformation pipeline. These modifications include resequencing of tasks by adding tasks, deleting tasks and changing the sequenced order of the tasks, each of which can have a significant impact on the overall functionality of the transformation pipeline. A simple example to this point will now be provided.

In this example, a transformation pipeline is created for identifying a total number of unique customers that are listed in two tables. The total number of unique customers will ultimately be determined by counting the total entries (e.g., number of rows or unique entries containing customer names) that remain after merging the tables. In this example, the transformation pipeline includes a first task for normalizing the data (e.g., customer names), a second task exists for merging the tables and entries of customer names, a third task exists for removing the duplicates. The last task is a summation or count of the rows or customer entries that remain in the normalized and merged data set.

If the tasks for merging and normalizing are swapped, it might not impact the final count of unique customers, inasmuch as the subsequent step will remove all of the duplicates that are created during the merge and/or normalization processes, regardless of whether the merge or normalization process is executed first. However, if the task for removing duplicates was sequenced before the merge or normalization tasks, the result might be very different, particularly if the final count includes new duplicates that are created during the subsequent normalizing and/or merging processes.

It will be appreciated that the foregoing example is only a very simple illustration and could, therefore, be easy resolved by a skilled data scientist who understands the best sequence for such a simple set of tasks. However, for more complex transformation pipelines, the data scientist might have to experiment with many different combinations and sequences of tasks in order to determine which sequence and combination of tasks is the most appropriate for a desired result. Unfortunately, any time the transformation pipeline is modified, there is a risk of unintended consequences, such as the creation of incompatibility between one task and another task in the transformation pipeline and/or the target data. Accordingly, it is often necessary for the data scientist to tinker with the selection and sequence of tasks during multiple trial and error sessions before the data scientist can verify that the transformation pipeline has been properly reconfigured. During this process, several alternate variations of the transformation pipeline are executed on the target data set, wasting significant time and computational resources. The foregoing can be particularly problematic when the data scientist may not be able to discover any underlying compatibility and/or functionality problems of the transformation pipeline until after the lengthy processing of the data set is complete and/or the data is later analyzed in subsequent data analysis processes.

The difficulty in diagnosing compatibility issues that arise during the resequencing of transformation pipelines, which can result in the waste of time and computing processes, represents a technical problem the industry is attempting to resolve.

BRIEF SUMMARY

The disclosed embodiments include methods, systems and computer program products for helping to address the technical problems associated with identifying and addressing compatibility issues that result from modifying transformation pipelines.

In some embodiments, an existing transformation pipeline is configured as a stored actionable task structure with a predefined plurality of sequenced data transforms. The actionable task structure is accessed and displayed to a user, by at least rendering the task identifiers for each of the tasks that are sequenced in the actionable task structure. Then, input is received for resequencing or otherwise modifying the actionable task structure. This input is sufficient to add a task, remove a task and/or reorder a task sequence in the actionable task structure. Then, based on this modification, the system accesses and compares attributes of the transforms associated with the tasks effected by the modification. These attributes include input requirements and effect attributes associated with the corresponding tasks. The comparison can also include an analysis and comparison of compatibility between the task/transform attributes and the target data set attributes.

When compatibility is determined, it can be reflected in the display of the task identifiers, along with one or more other visual indicators. The visual indicators are used to reflect incompatibility problems discovered during the attribute comparison analysis and/or to otherwise visually distinguish tasks based on relative compatibility/operability. Suggestions for improving and/or resolving incompatibility issues are also reflected at the display of the actionable task structure. The visual indicators can also be used, in some embodiments, to reflect suggested changes to the actionable task structure, which are determined based on a comparison of the task and data set attributes. Thereafter, the actionable task structure is further modified, based on user input directed at the visual indicators.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only exemplary embodiments and are not therefore to be considered to be limiting in scope, embodiments will be described and explained with additional specificity and detail through the use of the accompanying drawings in which:

FIG. 4A illustrates a key term index data structure that is used to index task names or other identifiers with semantic terms and/or syntactic terms associated with the tasks.

FIG. 4B illustrates a data set attribute index data structure that is used to index types and dependency attributes of identified data sets.

FIG. 4C illustrates a transform dictionary data structure that is used to index task attributes.

FIG. 4D illustrates an actionable task structure comprising a plurality of different tasks that are saved as a single assembly.

DETAILED DESCRIPTION

Figure 1A:
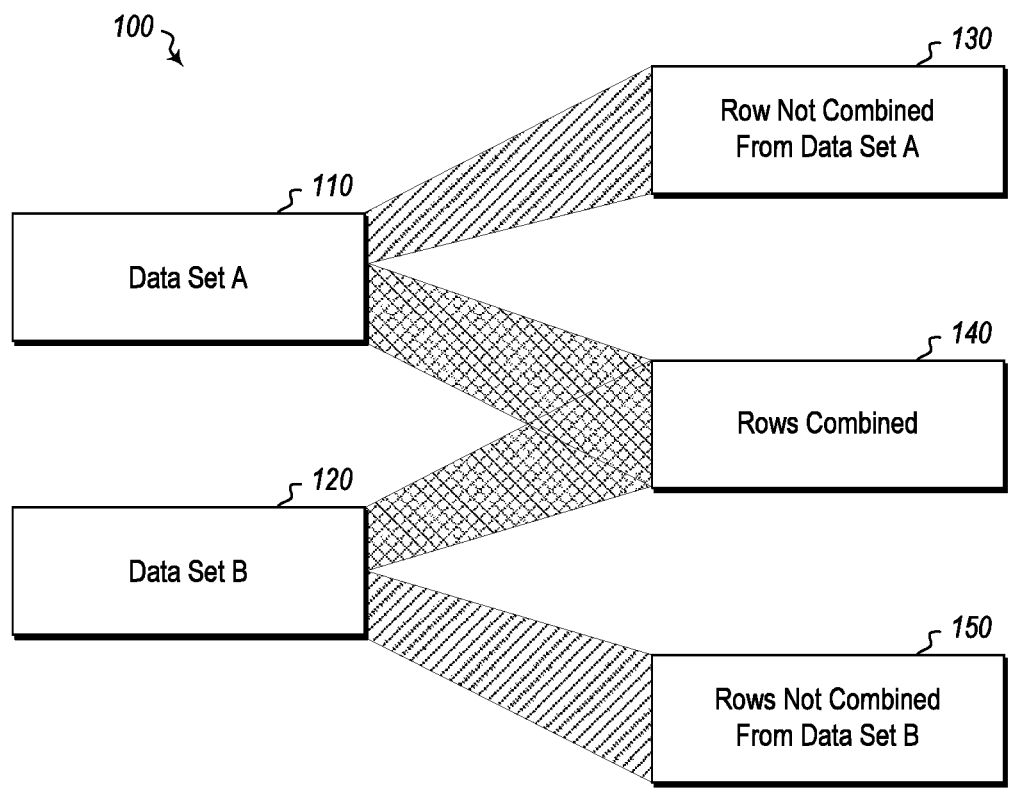
FIGS. 1A-2B illustrate examples of data visualizations.

The disclosed embodiments include methods, systems and computer program products that can be used for helping to address the technical problems associated with identifying and addressing compatibility issues that result from resequencing transformation pipelines, wherein the resequencing may include any combination of adding a task, removing a task or reordering tasks in a preexisting transformation pipeline.

In some embodiments, an existing transformation pipeline is configured as a stored actionable task structure with a predefined plurality of sequenced data transforms. The actionable task structure is accessed and displayed to a user, by at least rendering the task identifiers for each of the tasks that are sequenced in the actionable task structure. When input is received for resequencing the actionable task structure, task identifiers and other visual indicators are used to reflect compatibility/operability of the tasks and/or to suggest changes to make to the actionable task structure. The suggested changes and overall compatibility/operability of the tasks are determined by detecting levels of correlation between task attributes and/or target data set attributes, as described in more detail below.

The disclosed embodiments provide features for helping to reduce the overall resources (including time and computer processes) required to identify and resolve incompatibility issues that result from resequencing actionable task structures. Even more particularly, the disclosed embodiments can help improve the efficiencies for quickly identifying incompatibility issues and potential solutions for solving the incompatibility issues without requiring an execution of the actionable task structures on target data sets whenever the actionable task structures are resequenced. This can significantly reduce wasted time and computational resources that would otherwise be required during the resequencing of actionable task structures.

The following disclosure will include a brief description of data visualizations that are used by data scientists while building actionable task structures, as well as for analyzing data with actionable task structures. A description of inventive interfaces that can be used to assemble and/or modify actionable task structures will also be provided (FIGS. 3A-3B), along with a description of data structures that are used to form at least a part of the actionable task structures and/or to index attributes of the actionable task structures and target data sets (FIGS. 4A-4D) and which store the attributes that are utilized to determine compatibility of implementing the actionable task structures. Then, a description of different visualizations of the actionable task structures will be provided (FIGS. 4E-4G), along with a description of the corresponding task identifiers and visual indicators that are used to identify compatibility/operability of the corresponding tasks and/or suggestions for improvising the compatibility/operability of the actionable task structures. Then, a description of methods for resequencing and performing other operations on the actionable task structures will be provided. This will then be followed by a brief description of suitable computing environments that can be utilized by and incorporated into the claimed invention will be described.

Data Visualizations

Attention will now be directed to FIGS. 1A-2B, which illustrate some non-limiting examples of visualizations that can be used by data scientists to analyze data and/or to help make decisions about the data transformations that might be necessary to put the data into a desired form for comparable analytics, such as in a learn-as-you go methodology (e.g., make a transform, graph the transformed data and repeat the processes until the data is in the desired final form). In this regard, it will be appreciated that the visualizations represented in FIGS. 1A-2B, as well as other data visualizations, can be utilized to represent correlations between the underlying data at different phases of data analysis. Accordingly, the scope of the disclosed embodiments is not limited by the types of data visualizations that are used nor the timing for rendering the visualizations during the disclosed processes for assembling and/or applying the actionable task structures. In fact, some embodiments include rendering these or other visualizations concurrently with the other interfaces that are described herein.

FIG. 1A illustrates a Sankey-type diagram, which is currently reflecting an example visualization of two data sets that are being joined with a SQL type join or other joining operation. For instance, in this example, data set A 110 and data set B 120 are shown as being combined. In this diagram, there are three streams flowing from the two data sets. The first stream 130 indicates rows from data set A 110 that did not combine with rows in data set B 120. The second stream 140 indicates rows that were joined between data set A 110 and data set B 120. The third stream 150 indicates rows from data set B that did not join to rows in data set B 120.

Figure 1B:
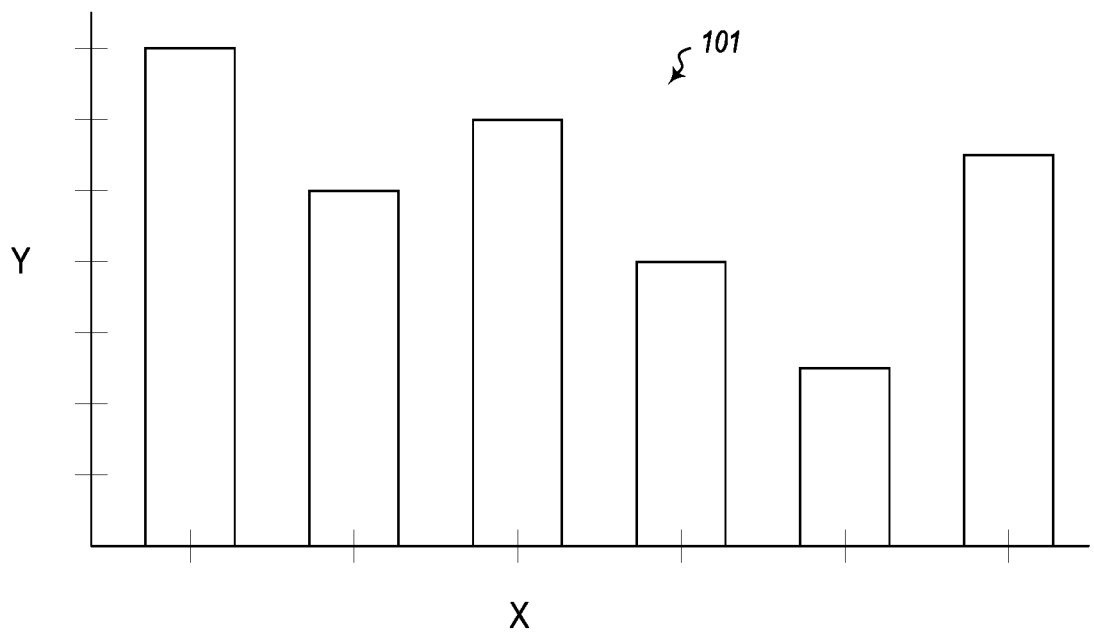

FIG. 1B provides an alternative example of an abstraction of a visualization that may be associated with a data set. In this example, bar chart 101 represents counts for items in a normalized set of data and how many times a value is associated to a record. For example, if the data set is tracking news events based on company name, the x-axis will track the unique companies and the y-axis will track how many times a company has been referenced.

Figure 2A:
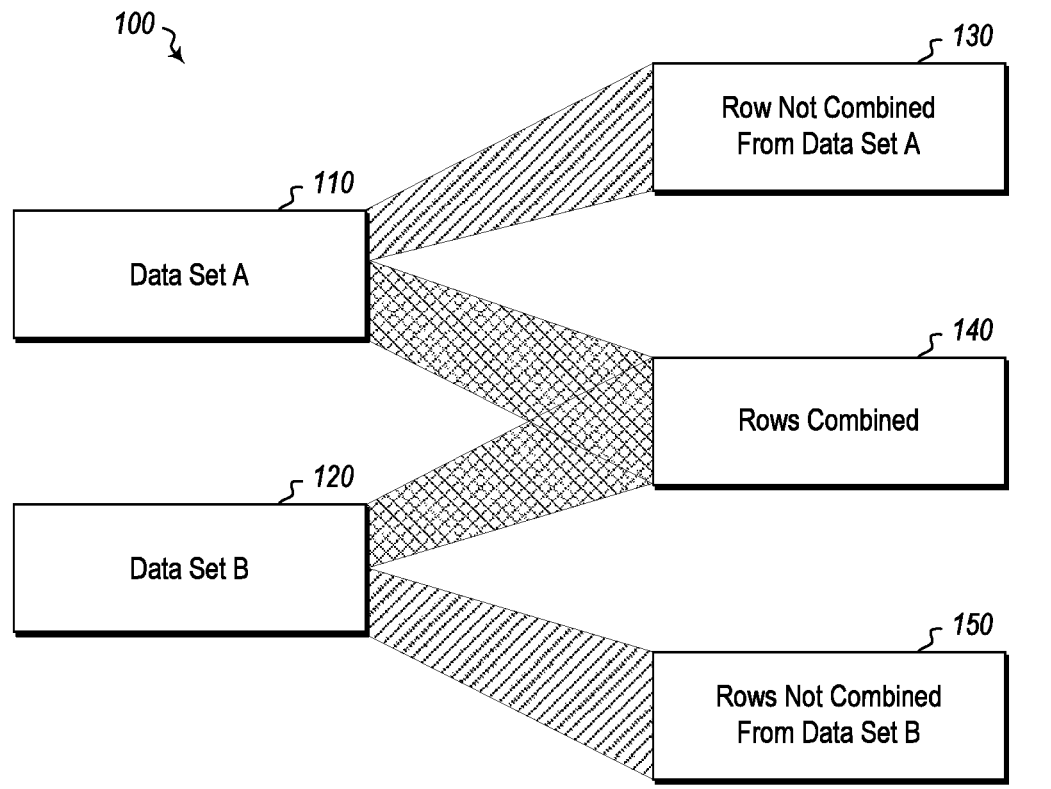
Figure 2A:
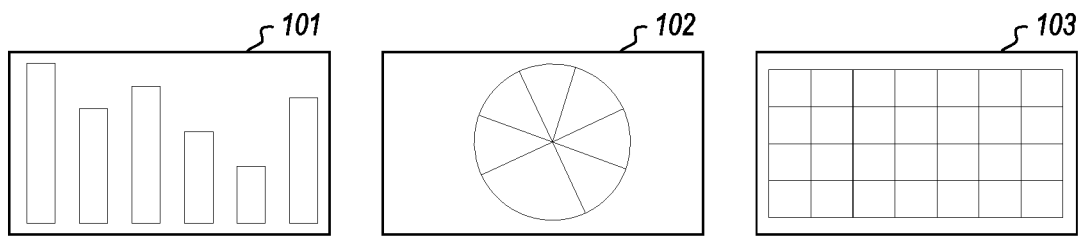

FIG. 2A provides an alternative visualization example where multiple data visualizations are provided in a single view. Each visualization is based on the same data set, but draws attention to different aspects of the data. For example, a user can alternate between a Sankey diagram 100 and Bar chart 101, within a single interface display, to identify possible data transformations operations to conduct. For example, Data set A 110 lists news events for a group of companies. Data set B 120 is a normalized list of those same companies with additional company information. Based on this visualization model, the user can investigate why all the rows in data set A 110 did not join properly with rows in data set B 120.

In this scenario, the user expected each row from data set A 110 to have a match in data set B 120 because it is a normalized list of values commonly referenced in data set A 110. To illustrate this, a data set that includes a company name can refer to that company in more than one way even though each entry refers to the same company. As an example, the same company may be listed as Microsoft, MSFT, and MS in different records of data set A 110, yet data set B 120 may only have one of these values. In such a case, only the matching values will properly match. To increase correlation, a user might apply a transformation for normalizing the company name throughout the data set to increase the number of combined rows. When such a transformation is applied, the resulting effect will be represented in both the Sankey diagram and the Bar chart. For instance, in the Sankey diagram, the size of the first stream 130 would reduce proportionally to the number of normalized records. In the Bar chart, the column associated to Microsoft would increase proportionally to the number of normalized records. Additionally, or alternatively, the data visualization could be represented as a Pie chart 102 or a table 103 of data records.

Despite the specificity of the foregoing examples, it will be appreciated that additional data visualizations can also be used, including Pareto charts, relationship diagrams, database join diagrams, or any other data visualizations, which may be rendered with the actionable task structure user interfaces that are used for generating and applying the actionable task structures to the identified data sets being visualized.

Figure 2B:
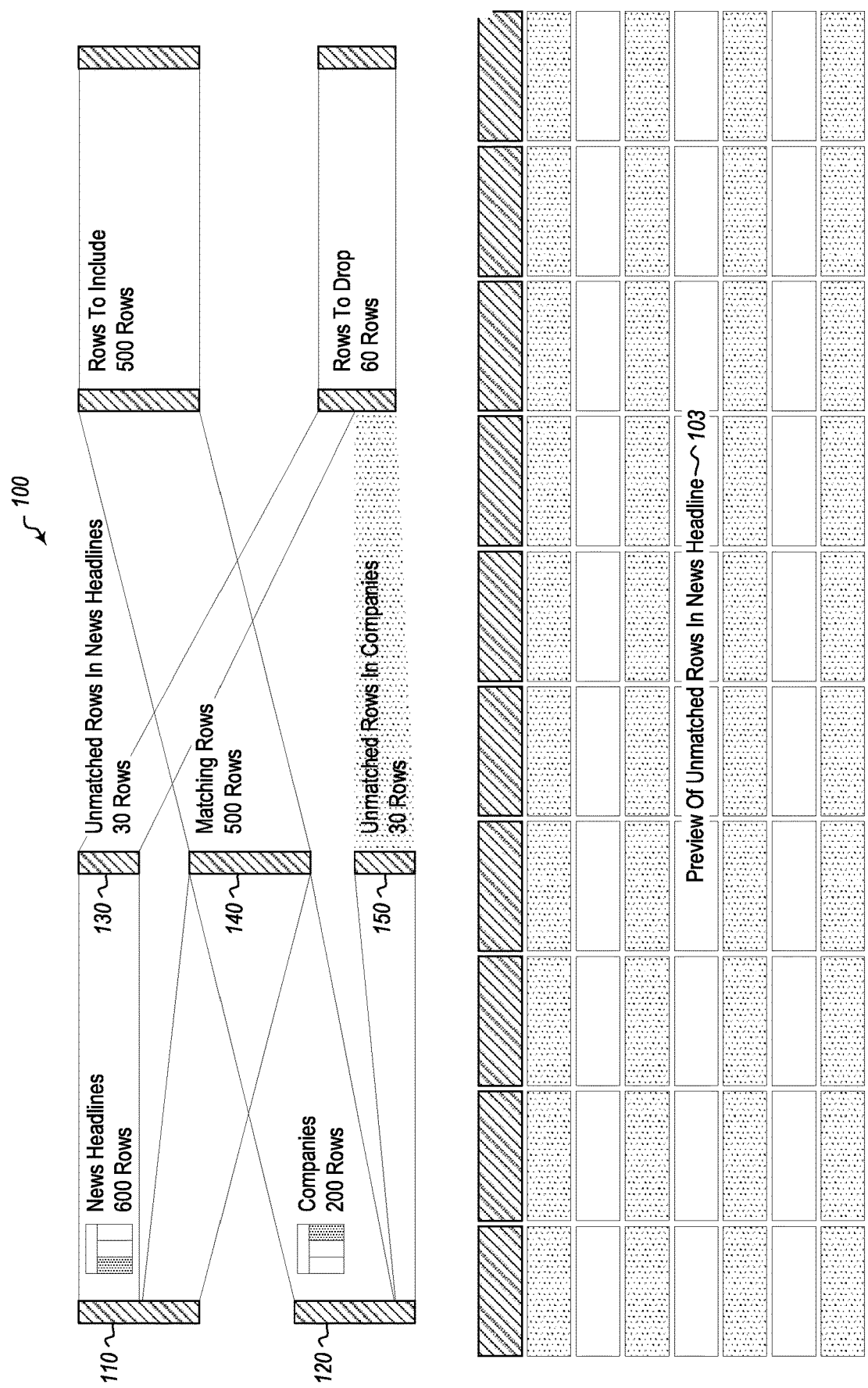

FIG. 2B provides an alternative illustration of an interface that includes multiple data visualizations in a single view and which can help a user understand the transformation effects on the data set. Here, a Sankey diagram 100 is combined with a table 103 of data records in a selected result set. For example, the table 103 lists data records from the first data stream 130 so that a user can visually inspect the data values within the table 103 that may help the user to identify data transformations that will enable more records to be joined between the data sets.

While data visualizations can be useful, for simplifying a set of data into a single view, users often need to modify data in the one or more data sets to obtain the desired transformation(s) and resultant transformed data set and/or visualization. In some cases, the data changes may only be a few records, but often, there will be many data records that need to be modified. In such a case, the ability to make the change(s) to the data often requires technical skills to transform the data; technical skills that many users may not necessarily have. Disclosed embodiments, described herein, help to address this problem by providing interfaces that are configured to identify and suggest transformations to make to the data sets that are contextually relevant and that can help the user obtain a desired result, as described in more detail below.

Interfaces and Data Structures

Figure 3A:
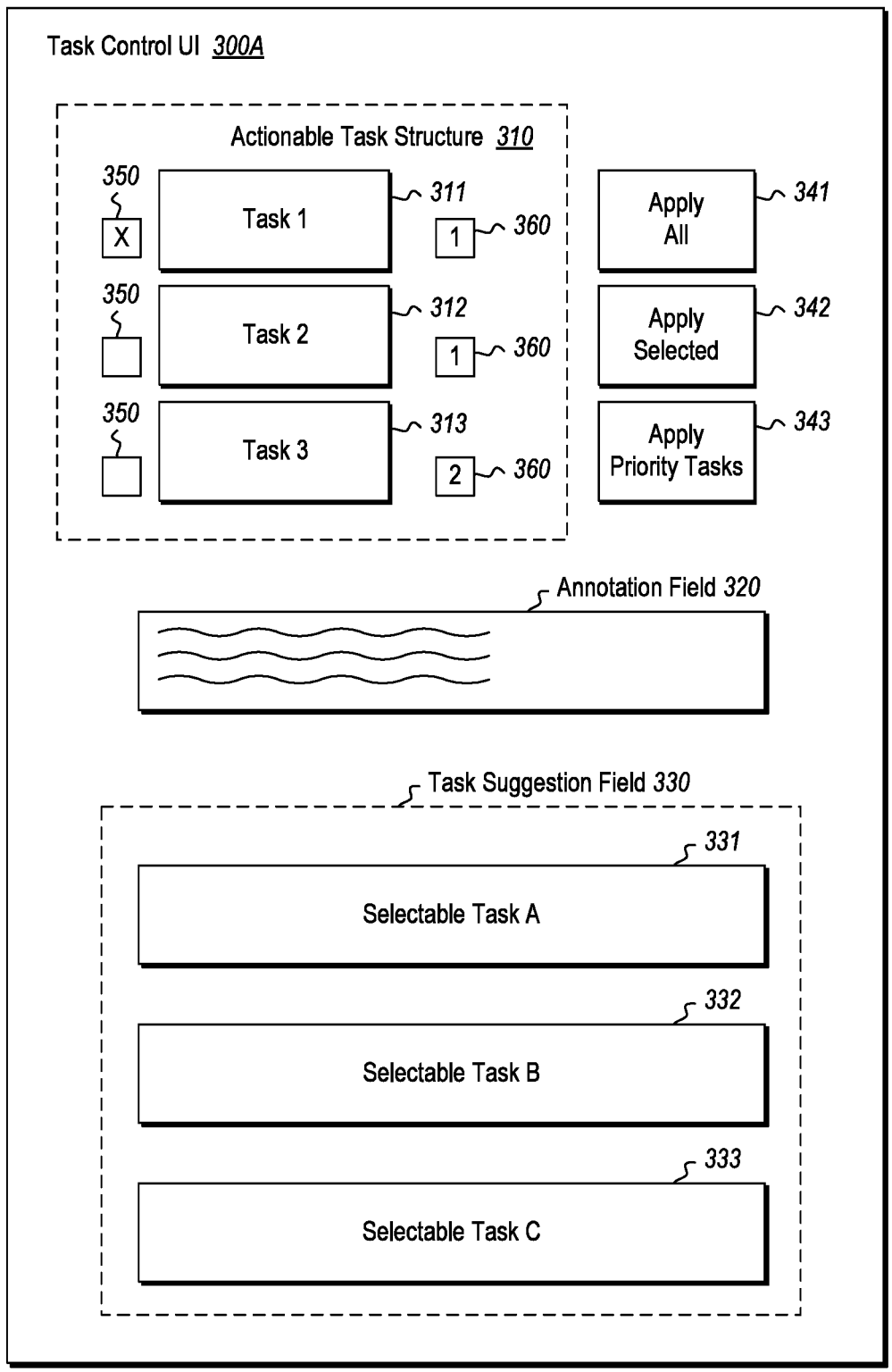
FIG. 3A illustrates a user interface that is sometimes referred to, herein, as a task control user interface or an actionable task structure user interface. This user interface includes a visualization of an assembled actionable task structure, an annotation field for receiving user input and a task suggestion field that displays suggested tasks to add to the actionable task structure. Controls are also provided in the interface for selectably applying tasks from the actionable task structure, collectively and/or individually.

FIG. 3A provides an exemplary task assembly structure user interface (hereinafter 'interface' or 'task control UI') 300A that is usable to generate an actionable task structure comprised of a plurality of separate transforms ('tasks') that are assembled into a single task structure. Each task in the structure comprises code defining a data transform in the form of computer executable code for performing a data transformation operation that is executable on data in a data set. In some instances, the code for each task is contained in the actionable task structure. In other instances, some or all of the transformation code is stored in other structures that are referenced by pointers in the actionable task structure. Specific examples of the form and attributes of the actionable task structure and the corresponding tasks will be provided later. For instance, an example of an actionable task structure is represented in FIG. 4D, while a related transform dictionary that indexes and identifies the different attributes of tasks that are available for assembly into the actionable task structures is represented in FIG. 4C.

Returning to FIG. 3A, the task control UI 300A can be instantiated or launched from a data management/manipulation application that is operable to perform transformations on data in a defined data set. Such a data set may include data from one or more storage locations and may be composed of data in one or more different formats. In this regard, it will be appreciated that the data need not be tabular or structured data and can comprise any combination of structured and/or unstructured data.

In some instances, the data management application has already been used to identify the scope or range of the data set for which the data transformations will be applicable including any combination of structured and unstructured data (e.g., by identifying the tables, files or data structures that are part of the data set). The task control UI 300A is operable, in some instances, to facilitate the selection of tasks to be applied to the data set to perform the desired transformations. For instance, while not shown, the UI 300A may include a selectable control which, when selected, provides the user with options for defining or selecting the scope of the data set.

In other embodiments, the UI 300A is instantiated by a user selecting particular data to be analyzed from a menu or other option in a data management software platform.

Once instantiated, the task control UI 300A will present an actionable task structure 310 and/or be used to generate/assemble the actionable task structure 310 to be used for transforming the identified data.

The actionable task structure shown in FIG. 3A currently illustrates three tasks 311, 312, 313, which collectively form the actionable task structure. Although only three tasks are shown in the present illustration, it will be appreciated that the actionable task structure 310 may include more or less than three tasks, depending on how many tasks have been selected by a user for inclusion into the actionable task structure 310.

Each illustrated task in the actionable task structure 310 is associated with data transform/operation that is executable on data in the data set to transform the data, or on a model of the data to transform the model of the data. It will be appreciated that the term transform should be broadly construed to apply to any transforming operation that can be applied to data, including altering a format or type of the data, performing a mathematical algorithm on the data, splitting the data, merging the data, normalizing the data, simplifying the data, tagging or annotating the data, moving the data, compressing the data, or any other data transformation that can be applied to the data.

Some non-limiting examples of specific tasks associated with these transforms include are join operations, normalization operations, truncation operations, rounding operations, and so forth.

In some instances, the actionable task structure defines a particular sequence for performing the assembled tasks in the actionable task structure. This sequence or order for executing the assembled tasks is controllable, for instance, based on the ordering in which the tasks are assembled or listed, or by a predetermined priority scheme and priority attributes set for the different tasks. In other instances, the sequence is controlled by an order of dependency relationships that are defined by attributes associated with the tasks. Combinations of the foregoing sequencing schemes can also be used to control the order in which the tasks in the assembled actionable task structure are executed.

In some instances, the tasks which are added to the actionable task structure 310, shown in the task control UI 300A, are selected by a user from a listing of suggested tasks. The listing of suggested tasks, which will be described later on, includes tasks identified, at least partly, in response to the suggested tasks having task attributes which semantically or syntactically match or correlate with (1) the data set attributes of the data in the identified data set, (2) task attributes and/or dependencies for other tasks in the actionable task structure 310 and/or (3) terms parsed form the textual input provided into annotation field 320, as described in more detail below.

Once the actionable task structure 310 is assembled, it is saved so that it can be accessed at a later time, such as to be modified and/or applied to one or more data sets in one or more different domains. The actionable task structure 310 can be saved automatically, as it is assembled and modified and/or in response to explicit save instructions based on user input received at the task control UI 300A or when the actionable task structure 310 is rendered in another interface (e.g., via save commands, selection of save menu controls or icons (not shown), and so forth).

Attention will now be directed to the annotation field 320, which is configured to receive input from a user. The annotation field 320 is illustrated in FIG. 3A with wavy lines that abstractly represent text entered by a user. The user input is a textual input that is entered through a physical keyboard, a display screen interface keyboard, voice-to-text interface or any other interface that is capable of entering text into the annotation field 320. In some instances, the user input is selected and/or entered through a drag-and-drop menu or other interface where the user selects suggested actions or elements for inclusion into the annotation field 320.

Terms, tuples, strings and other characters entered into the annotation field 320 are used to reference a key term index 410 (FIG. 4), to search for and identify one or more tasks having attributes that match or that are otherwise associated with the terms parsed from the textual user input. Key term index 410 and other data structures that are used to store task attributes (as well as data set attributes) are made accessible to the task control UI 300A to determine correlations between textual input, the task attributes and/or the data set attributes.

FIGS. 4A-4C illustrate some of the different data structures that may be used to index and correlate similarities between the text entered into the annotation field with attributes of different tasks as well as to index and correlate similarities between data set attributes and the attributes of the tasks. In FIG. 4A, for instance, a key term index 410 is provided with different fields that correlate task names or other identifiers 412 with (1) certain semantic terms and/or tuples 414 and/or (2) syntactic terms and/or tuples 416 associated with each of the indexed tasks in the key term index 410.

When input is entered into the annotation input field 320, a parser parses the terms and/or tuples from the textual input and references the key term index for any matching terms/tuples in the semantic and/or syntactic term fields (414, 416). When a match occurs, the corresponding task is identified as a suggested task to be presented to the user within the task suggestion field 330 of the task control UI 300A.

A data attribute analyzer also examines the identified data set to identify attributes of the data set, wherein the identified data set may have any size/granularity (e.g., database, file, column, row, field, term, page, worksheet, etc.)

The data set attributes include types, formats and dependencies of data contained within different data fields (of structured data sets). The data attribute analyzer may also perform parsing of unstructured data sets to identify similar attributes of the underlying data in the unstructured data sets.

The data set attributes include data types and data dependencies. The data types includes types, formats and classes of data in the identified data set. The data dependencies reference other data fields or variables that depend from a particular data item or that the particular data item depends from. The types and dependencies can be indexed by particular data items (e.g., data locations or data names, by adding a separate column and fields for correlating the data items to the data set attributes, not shown). Alternatively, the data set attributes for a defined data set can be indexed with less granularity, and more generality, by simply identifying the types and dependencies that are present in the data set, for comparison to task attributes identified in the transform dictionary 4C.

FIG. 4B illustrates an example of a data set attribute data structure 420 (with corresponding type 422 and dependency 424 attributes identified within the data set attribute data structure 420). The data set attributes, regardless of how they are stored, are referenced by the task control UI 300A or another system component to identify correlations between task attributes and the indexed data set attributes. When a correlation occurs, the related task is also added to the task suggestion field 330.

The illustration of the data set attribute data structure 420 is only a very simple and non-limiting example. Accordingly, it will be appreciated that the data set attribute data structure 420 may contain other formats for storing any type of data set attributes that are desired for consideration when determining contextual relevance of tasks to suggest to the user for the actionable task structure.

In some alternative embodiments, for example, the data set attribute data structure 420 has a different format and is configured to index annotation data that a user has tagged the data with during editing/annotating of the data set. Additionally, or alternatively, the data set attribute data structure 420 can be configured to identify variations of similar terms or data outliers that deviate in type or format from other data within a predetermined data set (e.g., detecting a single cell in a column that has a different type or formatting of the data relative to the other column cells). Spellchecking tools, grammar tools, and debugging tools/modules can be used to help find inconsistencies in the data types and formats, relative to other selected data and/or relative to separate or third party indexes.

Any data annotations or other attributes that are determined to be relevant (based on user settings) and that are identified by the data attribute analyzer are stored in the data set attribute index 420 for comparison to the task attributes in a transform dictionary. The stored data set attributes are then used, as described herein, to determine whether there is a sufficient correlation/contextual relationship to surface the corresponding tasks for presentation to the user in the task suggestion field 330.

The task attributes, referenced above, include any combination of the data that is indexed or otherwise referenced by the transform dictionary 430 (FIG. 4C). These task attributes form a part of the corresponding tasks and may include, for example, a task type/name 432, task effects 434 (semantic and syntactic effects/terms associated with the functionality of the task transform, which may include terms like add, remove, transform column, merge, normalize, transform row, remove, schema change, etc.), inputs 436 (which include input types expected by the task, such as a number, string, integer, character, etc.), outputs 438 (which include the type of output resulting from the transform, such as a number, string, integer, character, etc.), the transform code 440 (which may include the actual code and/or a pointer to the actual transform code), and dependency information 442 (specifying required tasks to be performed prior to or subsequent to the corresponding task), and priority level information 444 (specifying priority settings of the task).

In most instances, the entire contents of the task (including all of their attributes and code) will not be provided to the user in the task suggestion field 330. Instead, only a limited portion of the task will be provided for view and selection. For instance, the task suggestion field 330 might only list a selectable name or other identifier for the referenced task. Other attributes and components of the task (which may be surfaced through another interface such as interface 300B) are hidden from the user in the task suggestion field 330.

When a user selects the task identifier in the suggested task field 330, or otherwise provides input for selecting a referenced task, that task will be added to the actionable task structure 310. In other embodiments, selection of a task identifier will trigger the launch of another a related user interface (e.g., interface 300B described below in reference to FIG. 3B), which can be used to obtain additional information about the task, enable editing of the task functionality and/or provide another mechanism for adding the task to the actionable task structure.

During use, the task control interface 300A and/or other components of the data management software/platform system will identify a set of one or more suggested tasks from the transform dictionary 430 based on correlations between task attributes in the transform dictionary with the data set attributes and/or the textual input parsed from the annotation field (e.g., semantic or syntactic terms matching the parsed input).

When more tasks are identified than can be displayed, the task control interface 300A will filter the list to render a subset of the suggested tasks. The listing of selectable tasks in task suggestion field 330 may be filtered and/or ordered based on an alphabetical ordering, by frequency of use, level of attribute correlation (between tasks and data and/or user input), by computational expense (e.g., the quantity of records that will be changed in the data set if the task is implemented), and/or by a logical ordering determined by the task control UI, such as based on a sequential dependency defined by order of operation rules or other predetermined rules that are referenced by the task control UI 300A.

Once a user selects tasks from the suggested tasks, those selected tasks will be added to the actionable task structure 310 in the order they are selected and/or as otherwise designated by the user input (e.g., drag and drop). When the first task is selected, and no other tasks already exist in the actionable task structure 310 (e.g., for editing), that first selected task will be the first task added to the actionable task structure 310. Then, every time a new suggested task is selected, it will be appended to the actionable task structure 310 and the actionable task structure 310 will be saved (either automatically in response to the addition of the task or in response to other explicit user input). As each task is added, the actionable task structure will be saved as an appended/updated actionable task structure 310 with the newly selected task(s).

FIG. 4D illustrates an example of an actionable task structure 450 which has been saved as a discrete assembled data structure (corresponding to Task 1 (311), Task 2 (312), and Task 3 (313)) from the actionable task structure 310. As shown, this actionable task structure 450 is configured with different fields for storing the correspondingly relevant effect, input, output, code, dependency and/or priority information of the related tasks, which was obtained from the transformation dictionary 430.

In some embodiments, the task control UI 300A is also configured with controls that are operable (when selected) for controlling the application of the tasks in the actionable task structure to one or more data sets (including the identified data set and/or data sets in other domains when the actionable task structure is invoked in another domain). For instance, the task control UI 300A includes an 'apply all' control 341 that is operable, when selected, to initiate execution of each task in sequence from the actionable task structure 310.

Alternatively, or additionally, the task control user interface tool 300A includes an 'apply selected' control 342 that is operable, when selected, to execute only tasks that have been selected from the actionable task structure 310 (e.g., with selection controls 350) in the actionable task structure 310 by the user. For instance, task 1 has been selected for controlled execution.

Different controls, such as 'apply priority tasks' control 343 can also be provided to enable selective control over which priority level tasks are executed (E.g., priority 1 tasks, priority 2 tasks, etc.). When the 'apply priority tasks' control 343 is selected, an interface option for selecting the priority level of tasks to be executed is surfaced for user selection. Each task may also have a priority setting 360 that is visible to or hidden from the user. When the apply priority tasks control 343 is selected and a corresponding priority is designated (automatically or in response to further input), then execution of the corresponding tasks having the designated priority will be executed.

In alternative embodiments, the tasks may also be selected by clicking on the task and a color or visual identifier may be changed to reflect that the task has been selected for execution (e.g., to be executed when the 'apply all' control 341, 'apply selected' control 342 or 'apply priority tasks' control 343 is subsequently selected).

When the tasks are executed (individually or collectively as part of the actionable task structure), a visualization of the transformed data will be updated and reflected to the user. In some instances, the visualization is presented in a same or different window than the task control UI 300A. In one embodiment, the visualization is a small thumbnail representation, such as shown in the charts 101, 102 and 103 of FIG. 2A.

Figure 3B:
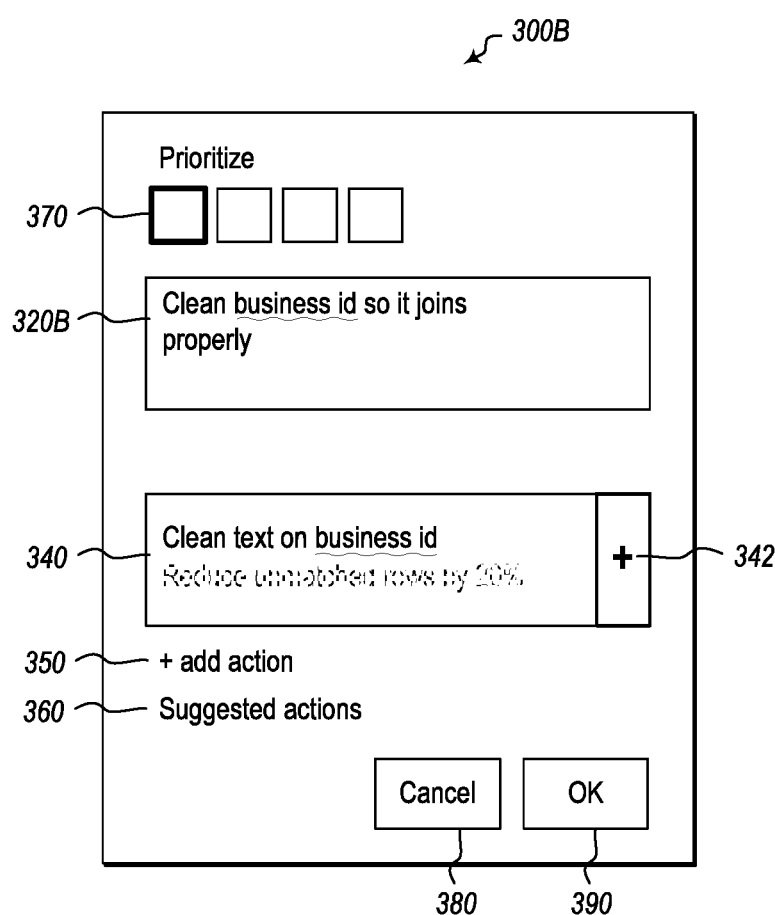
FIG. 3B illustrates another user interface that includes controls for setting priority of tasks, for editing a task and for adding a task to an actionable task structure assembly.

Attention will now be directed to FIG. 3B, which provides a user interface 300B that may be triggered for display separately from the task control UI 300A in FIG. 3A or that may be a supplementary user interface that is presented concurrently with the task control UI 300A (such as, for example, in response to a user selecting one of the selectable tasks from task suggestion field 330 or actionable task structure 310). The user interface 300B may also comprise a part of the task control UI 300A in some instances.

In some embodiments, the task control UI 300B is surfaced (displayed) in response to identifying a task that correlates with one or more key terms added to the annotation field 320 (dynamically in response to entry of the key terms). Selection of an icon (not shown) or a menu option (not shown) will also trigger, in some instances, a display of the task control UI 300B.

Task control UI 300B includes an annotation field 320B, which may include/mirror the text from annotation field 300A. Accordingly, this annotation field 320B includes text corresponding to an action the user would like to take on the identified data set.

The selected task from task control UI 300A is presented in a corresponding task field 340 of the task control UI 300B (e.g., by presenting selectable task A 331 if the selection of task A 331 triggered the display of task control UI 300B). If the user has not yet selected a task from the suggested task field 330, the task field 340 will present a new suggested task that is based on the context of the user text and/or the data in the data set, as generally referenced above, based on correlations between the different data set and task attribute sets and textual input.

The suggested task is sometimes presented within the task field 340 with additional information that describes one or more effects or results that are associated with the task, such as, for example (in this instance), the quantity of rows that will be effected by applying the task/data transformation operation on the data set (e.g., 'reduce unmatched rows by 20%'). It will be appreciated that other effects will correspond to different tasks and/or data sets. In some instances, the text for the effects can be obtained from metadata stored with the indexed transformations and/or from performing a background/sandbox implementation of the transform to dynamically ascertain the particular impact any task will have on a particular data set once the task is identified and/or selected by a user.

A visual indicator 342 is also provided, which is operable, when selected, by the user to add the suggested task 340 to the actionable task structure (e.g., actionable task structure 330A).

Task control 300B also includes additional controls, such as the '+ add action' control 350, the suggested actions control 360, priority controls 370, and controls to cancel (380) or OK (390) settings defined by the task control 300B.

The '+ add action' control 350 is operable, when selected, to add a new task to the task field 340, such as a next suggested task from the task suggestion field 330 and/or to add a new task operation to a defined task in the task field 340. For instance, selection of the '+ add action' control 350 may generate a list of one or more selectable add on operations that are capable of being merged with the task in the task field 340 and/or for editing the stored task attributes for that task.

The 'suggested actions' control 360 is operable, when selected, to cause a display of the task suggestion field 330 and/or to update the task suggestion field 330.

The priority controls 370 present selectable controls that are operable, when selected, to assign priorities to the tasks displayed in the task field 340. Each of the boxes in the prioritizing controls 370 correspond to a different color and priority level. For instance, red tasks may indicate high priority tasks, whereas orange tasks are less of a priority than the red tasks and yellow tasks are less of a priority than orange tasks. Any number of colors and task priority levels may be represented, so long as they differentiate from other levels in the controls. When a user selects a particular box/priority from the priority controls 350, the corresponding task (e.g., the task in task field 340) will be assigned the corresponding priority). The priority assignments are referenced, in some instances, by the task control UI 300A for sorting the tasks that are presented in the actionable task structure (e.g., actionable task structure 310) and/or for enabling filtered operation of the tasks by particular priority.

As an alternative embodiment, the priority controls 370 can include a numerical ranking, a high-medium-low determination, or other means for indicating priority instead of a color coding sequence. Alternatively, or additionally, the priority controls 370 may indicate a classification for the identified task. The classification can be based on user provided key words, color coding, or other indicator of similarity. For example, tasks correlated to normalizing data may be indicated with a color blue and tasks correlated to concatenating, or combining fields in a data set are indicated with a color orange. The categories displayed in the category field 350 may be user indicated and/or associated to the task itself by default.

Figure 4E:
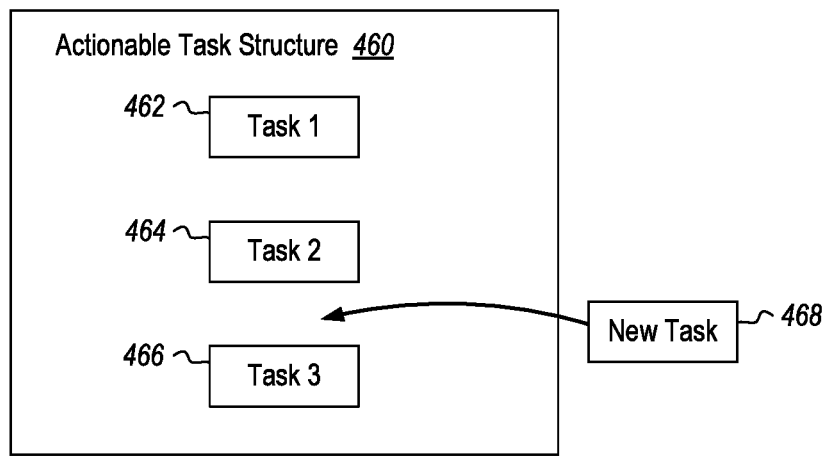
FIG. 4E illustrates a visual representation of an actionable task structure that is displayed with task identifiers for different tasks of the actionable task structure. A new task is also being added to the actionable task structure.
Figure 4F:
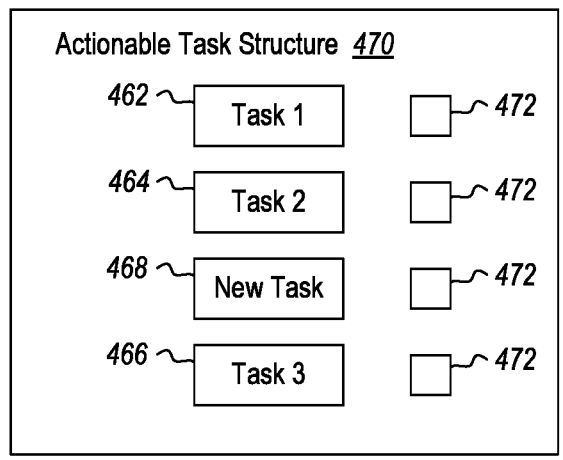
FIG. 4F illustrates a visual representation of an actionable task structure that is displayed with task identifiers for different tasks of the actionable task structure, as well as with visual indicators reflecting relative compatibility/operability of the corresponding tasks.
Figure 4G:
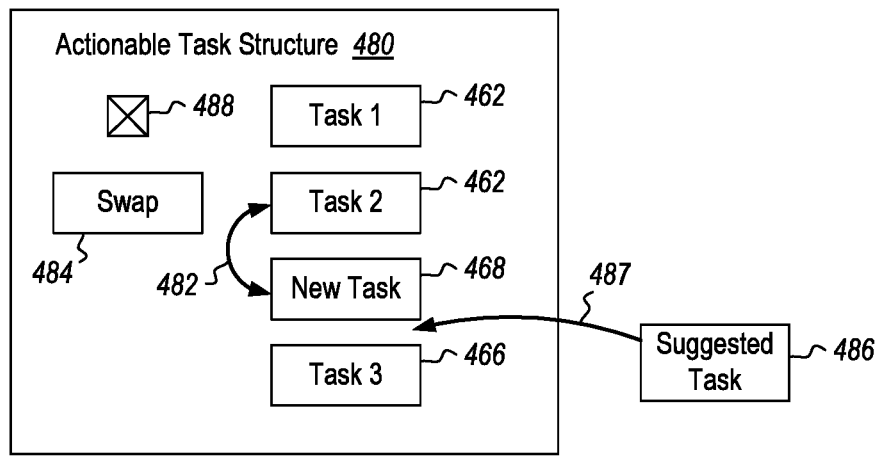
FIG. 4G illustrates a visual representation of an actionable task structure that is displayed with task identifiers for different tasks of the actionable task structure, as well as with visual indicators reflecting suggested changes to the actionable task structure and selectable controls included with the visual indicators for implementing the suggested changes.

Actionable Task Structure Visualizations, Task Identifiers and Visual Indicators FIGS. 4E-4G illustrates different examples of actionable task structure visualizations that are rendered with task identifiers for the different tasks in the actionable task structure, as well as with visual indicators corresponding to the compatibility and operability of the different tasks in the actionable task structure.

It will be appreciated that these visualizations of the actionable task structure may be presented independent of or in combination with the other actionable task structure interfaces described herein. For instance, actionable task structures 460, 470 or 480 could replace actionable task structure 310 while being rendered within task control UI 300A, with or without a concurrent display of the data visualizations (e.g., FIG. 1A-2B). Alternatively, actionable task structures 460, 470 or 480 can be rendered without simultaneously rendering any of the data visualizations or components of the task control UI 300A.

As shown in FIG. 4E, the actionable task structure 460 (which comprises a visualization of the underlying structure 450 of FIG. 4D) is rendered with three task identifiers (462, 464 and 466) for the corresponding predetermined sequence of the tasks composed in the underlying task structure 450. Each of these task identifiers is selectable, thereby enabling a drag and drop of the task identifiers within the actionable task structure visualization 460, as well as in the underlying data structure 450. If, for instance, task 3 identifier 466 were selected and moved between task 1 and task 2 identifiers, then the corresponding task 3 would be resequenced, persistently, in the underlying actionable task structure (e.g., task structure 450 of FIG. 4D) ahead of task 2, after task 1. This change would also be persistently reflected in the visualization, unless and until a subsequent modification was made for resequencing the tasks.

The actionable task structure representation 460 (and underlying saved data structure 450) can also be resequenced when a new task is added to the actionable task structure. For instance, a new task is being added to the actionable task structure 460, as reflected by the visualization of new task 468. This can occur, for instance, when a user selects one of the suggested tasks from the task suggestion field. Alternatively, a new task identifier may appear next to the actionable task structure 460 (which corresponds to a stored task in the transform dictionary 430), which is selectable for a drag and drop into the actionable task structure at a desired location. When the new task identifier 468 is added to the actionable task structure 460, the underlying task from the transform dictionary 430 is added to the saved actionable task structure representation 450.

The actionable task structure representation 460 can also be resequenced by deleting one or more of the tasks from the actionable task structure representation 460. For instance, a user can select and delete any of the task identifiers (462, 464, 466) from the actionable task structure 460. This will trigger the deletion of the corresponding task from the underlying saved actionable task structure 450.

While the foregoing examples have been described with reference to user input for directly interacting with the task identifiers for resequencing the actionable task structure 460, it will be appreciated that in alternative embodiments, menus and corresponding controls or menu options can also be provided to receive user input for adding, deleting or moving/reordering any of the tasks in the actionable task structure representation 460, based on the user input, without requiring a user to directly interact with the task identifiers.

As described above, the resequencing of the actionable task structure can have detrimental consequences on the other tasks in the task structure, as described above, based on the task attributes for each task, as defined in the transform dictionary and the saved actionable task structure 450. In particular, one task may have input attributes and/or dependency attributes that are not satisfied unless that task follows another task in a predetermined sequence. Accordingly, moving that particular task (without moving the preceding task it needs to depend from) or by deleting the preceding task or by adding a new task immediately between the preceding task and the particular task can cause incongruities and errors in the data transform performed by that particular task. By way of example, the preceding task may transform the data from the data set into a particular value pair format or data type that is required by the particular task and that other tasks in the actionable task structure are not configured to process.

In some embodiments, the relative compatibility/operability of the tasks is reflected with visual identifiers that are presented with the actionable task structure. For instance, FIG. 4F illustrates an actionable task structure 470 that includes visual identifiers 472. These identifiers may contain coloring, textual labels, flags, tags, icons or other features that reflect relative compatibility and/or operability of the corresponding task identifiers they are presented next to. For instance, when a new task is added to the actionable task structure 460, generating the visualization 470 and the changes to the underlying the actionable task structure 450, the system may determine that task 3 is now incompatible and/or inoperable based on the output from the new task (based on an analysis of the task attributes for the new task and task 3). This inoperability or incompatibility can be reflected by changing the visual identifier 472 proximate task 3 and/or task 4 into a different color or icon that reflects the inoperability/incompatibility relative to the other tasks. Even more particularly, the visual identifiers 472 for tasks 1 and 2 might be colored green and the visual identifiers 472 for the new task and/or task 3 might be colored orange or red. The visual identifiers can also include labels that explicitly state compatible or operable for corresponding tasks that are determined to be compatible or operable, while the tasks that are determined to be incompatible or inoperable will be designated by corresponding visual identifiers that state incompatible or inoperable.

FIG. 4G reflects another implementation of the visualizations that can be used with the actionable task structures. In this embodiment, an actionable task structure 480 is presented with a visual identifier 482 that reflects a suggested reordering or swapping of task 2 (462) and the new task (468). A textual label 484 for the visual identifier 482 can also be used in addition or instead of the visual identifier 482.

In some embodiments, the visual identifier(s) 482 and/or 484 are selectable controls which, when selected, trigger the functionality associated with the identifiers. For instance, selection of identifier 482 and/or 484 will trigger resequencing of task 2 and the new task 468.

In some instances, the visual identifiers include suggestions for adding new tasks to the actionable task structure, such as identifier 486 (reflecting the task identifier) and/or 487 (reflecting placement in the actionable task structure). When selected, the corresponding task (which is defined in the transformation dictionary 430) will be added to and persisted in the underlying actionable task structure 450. The identification of the suggested task and/or placement of the task is based on an analysis of the underlying task attributes defined in the transform dictionary and/or the data set attributes, as described throughout this application.

A control 488 for deleting or ignoring the suggestions provided by the visual identifier(s) 482, 484 and/or 486 can also be visually represented with the visualization of the actionable task structure 480. When selected, the control 488, will cause the visual identifiers (482, 484 and/or 486) for the suggested actions to be deleted from the interface visualization 480.

Visual identifiers for deleting one or more task from the actionable task structure can also be utilized. For instance, by way of example, control 486 could be a visualization that, when selected, triggers the deletion of a task that it references with a label and/or that it is positioned next to. In this example, selection of control 488 could trigger the deletion of task 1 from the actionable task structure, for instance.

Figure 5:
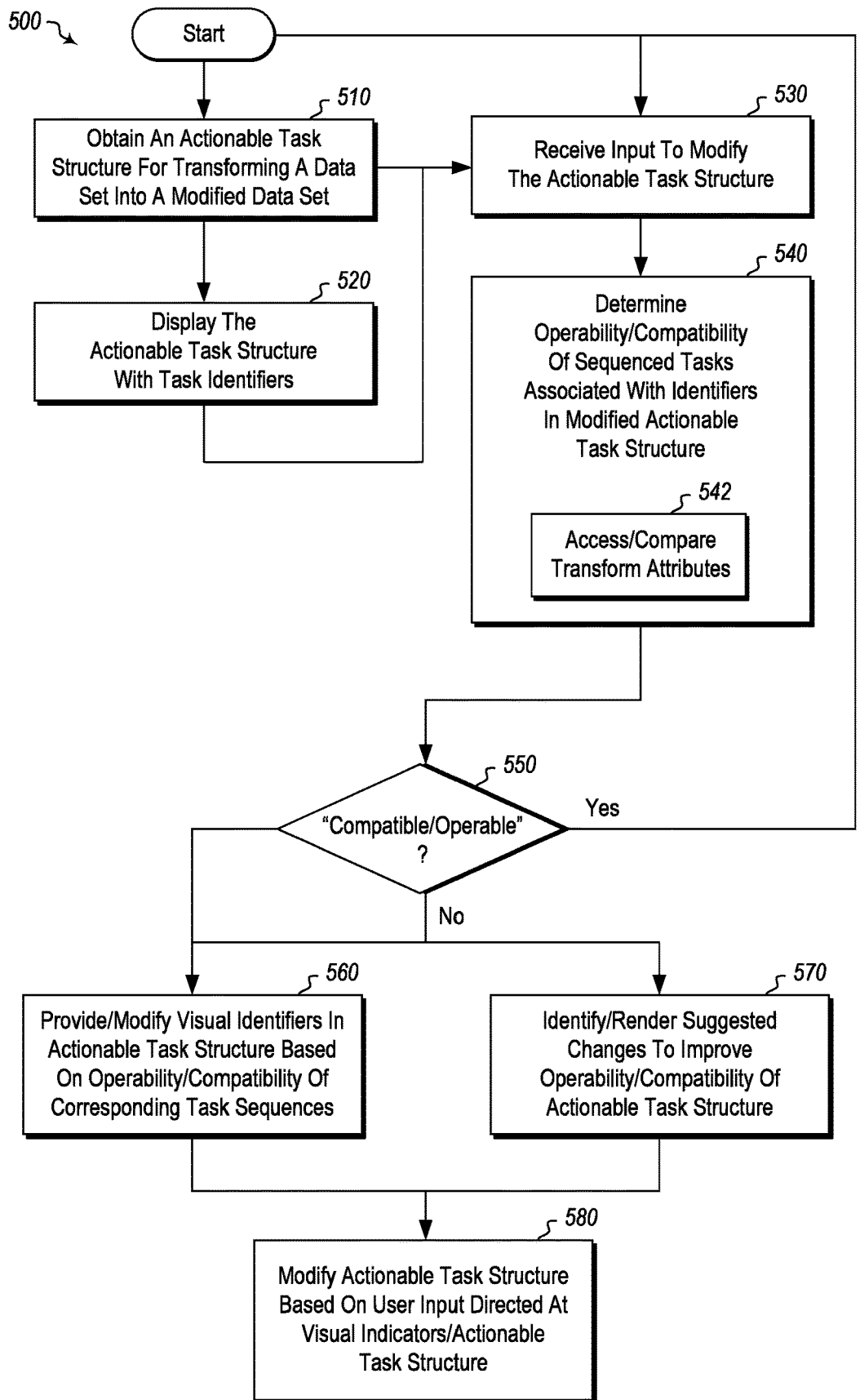
FIG. 5 illustrates a flowchart that includes acts associated with methods for resequencing actionable task structures.

Attention will now be directed to FIG. 5, which illustrates a flowchart 500 of acts associated with computer implemented methods for resequencing actionable task structures. As illustrated, the disclosed methods include acts of accessing and displaying an actionable task structure that is operable for transforming a data set into a modified data set (act 510). This actionable task structure can be, for instance, task structure 450 and can be represented as actionable visualizations 310, 460, 470, 480 and so forth, which is displayed with task identifiers for each of the different corresponding tasks (act 520), which reflect the sequence (e.g., order of operation) of the tasks in the underlying actionable task structure.

Then, input is received for resequencing or otherwise modifying the actionable task structure (act 530). This input is sufficient to add a task, remove a task and/or reorder a task sequence in the actionable task structure, as described above. Then, based on this modification, the system determines operability and/or compatibility of the sequenced tasks (act 540). This may include the system accessing and comparing the task attributes of the tasks and underlying data transforms (as defined in the transform dictionary and/or actionable task structure 450).

In some embodiments, the comparison of the attributes includes determining there is a match or correlation between outputs associated with a preceding task in the actionable task structure and inputs that are associated with a subsequently sequenced task in the actionable task structure. In other embodiments, the comparison includes, additionally or alternatively, a determination of correct dependencies based on the dependency attributes. The comparison of the attributes may also include, additionally or alternatively, an analysis of the task attributes with the data set attributes contained in data set attribute index 420 and/or key terms in key term index 410.

In some instances, the analysis is performed separately, for each task relative to inputs available to the task and that are required for the task at the designated stage in the sequence of tasks. In these instances, the analysis may include an evaluation of outputs that are provided from a preceding task, without actually having to execute the task. It will be appreciated, that this can save significant computing resources that would otherwise be required to evaluation functionality of a complete actionable task structure. In other embodiments, a background is used to test execution of the task(s) effected by the resequencing prior to making a final determination of compatibility/operability (550) and prior to performing any further acts in the disclosed method. The system may also reevaluate the compatibility/operability in response to any detected change to the actionable task structure or target data set, or a user request to save or execute the actionable task structure, and/or based on a predetermined period (e.g., every few minutes).

When a final or preliminary determination is made regarding compatibility/operability (act 550), the system will then provide/modify visual indicators in the actionable task structure based on the determined operability/compatibility of the corresponding task sequences (act 560). These visual indicators may include any of the visual identifiers described in regards to FIGS. 4E-4F, as well as modifications to the task indicators themselves (e.g., by changing a font type or color of the task indicators, such as a red or italicized font to reflect incompatibility issues).

The system may also, based on the determination (550), identify or render suggested changes to improve the operability/compatibility of the actionable task structure (act 570). These suggested changes can include the presentation of certain visual identifiers and/or controls (e.g., identifier/controls 482, 484, 486, 487, 488, and so forth).

Next, the system will make a further modification to the actionable task structure based on new input that is received and directed at the visual indicators/identifiers described above (act 580). Any modifications made to the actionable task structure are reflected by the presentation/sequence of the task indicators within the actionable task structure visualization. These changes are also persisted in the underlying actionable task structure, such that it can be invoked and applied in one or more different domains (e.g., to different data sets or applied through different interfaces and/or with a different data management session). The act of saving the actionable task structure may include storing the actionable task structure separately from the transformation dictionary that includes a listing of all tasks available to a data management software platform. The stored actionable task structure may include any of the components shown in the actionable task structure 450 of FIG. 4D. This actionable task structure (which includes a plurality of discrete tasks that have been assembled through the task control UI 300A or another interface) will be saved with a single file name that represents the composite assembly, such that it can be invoked by reference through one or more interfaces and domains at a later time.

Some embodiments further include receiving input for applying one or more of the tasks from the actionable task structure, concurrently with the build/resequencing processes described above, or at a later time. In some instances, the tasks from the actionable task structure to be executed and the sequence for executing those tasks are further determined with the features and controls described above, including the priority settings 360, the listed ordering of the tasks, the selection controls 350, the apply all control 341, the apply selected control 342 and/or the apply priority tasks control 343.

Contextual Correlations

As described above, different contexts are sometimes used to identify suggested tasks to be assembled into an actionable task structure (which can resequence an existing actionable task structure). Interfaces are also provided to reflect the suggested tasks for user selection and/or locations for inserting those tasks. Suggestions for resequencing the order of tasks and/or for deleting tasks are also provided in some instances. Additional examples regarding techniques associated with identifying and applying these contexts will now be provided.

In most of the instances, described above, context is based on correlations between the data set attributes, the task attributes and the semantic/syntactic terms parsed from the annotation field. However, other forms of context can also be used, in some instances (in addition and/or in the alternative) to help find suggested tasks (e.g., for the task suggestion field and or for direct insertion into an actionable task structure visualization (e.g., suggested task 486)). Some of those additional forms of context will now be provided, as well as some examples for utilizing the context (attribute correlation) described above.

In one embodiment, a context used for identifying a suggested task is based on the particular data set/object selected by the user to trigger the display of the task control user interface. For example, if a user right-clicks on the first data stream 130 (i.e. the rows not combined in data set A), the context would be based on the context of attribute correlation between the data set attribute of unmatched combinations and task attributes for tasks related to data transformations that would increase the number of available combinations for data in that data set. As an example, a single company may be spelled in more than one way in different records of data set A 110 (e.g. Microsoft, MSFT, and MS), yet data set B 120 may only have one of these values. In this instance, if the user triggers the task control user interface by indicating their interest in the rows that were not combined, a context will be identified that is associated with finding ways to combine the rows, such as a context associated with merging or normalizing values for disparate names. Accordingly, a suggested task would be to identify all data records in data set A 110 with a value of "MS" and modify or replace those values to "Microsoft." Another suggested task would identify all data records in data set A 110 with a value of "MSFT" and modify those values to "Microsoft." In this regard, the context is very granular, to the specific types of company names and possible alternatives for normalizing the terms. Additionally, or alternatively, a suggested task would combine the last two examples as a single suggested task. In this sense, the context would be a format of the data, as a merged data field or separate data fields for company names.

As referenced above, the correlation matching can be based in part on the textual input from the user in the annotation field. As an example, one or more selectable tasks 331, 332, 333 would be suggested based on parsing the text of the annotation field and determining data transformation operations associated to the text from the annotation field. For example, a user may provide the textual input of "clean business_id so it joins properly". Based on parsing this text and determining related data transformation operations having similar key words in the transformation labels or metadata defined in the task attributes of the transformation dictionary, different tasks would be identified that have declarations in the effect term field to "clean text on business_id" or syntactically similar declarations, where the operation includes executable code to normalize values and/or fix typos in the "business_id" field of the data set. Any identified tasks would then be presented as one or more of the selectable tasks displayed for selection by the actionable task structure interface.

As an alternative example, a user provides textual input of "multiply the sales tax and MSRP values". Here, the terms sales tax and MSRP are used to identify corresponding fields in the data set and to identify formats and types of those fields as numbers. Then the system identifies transformations that are configured to perform a multiplication on numbers based in part on identifying transformations having labels or metadata associated with multiplication (a synonym for a keyword in the annotation field). Based on this analysis, the system may identify a suggested transformation for performing a task to "combine sales tax field and MSRP field by multiplying them."

As an alternative or additional embodiment, the context (attribute correlation) is based in part on a task already enqueued in the actionable task structure. For example, a suggested task might parse a string value into a separate address, city, state, and zip code fields based on pattern recognition of the data set. After the user selects this task, some of the zip code fields may be empty. Based on the context of knowing a city and state, a suggested task to look up the zip code based on the city and state could be a suggested task. The zip code lookup capability could be based on similar data in the data set with the same city and state. Alternatively, an external system can be queried to look up that information, for example, from a web service.

As an alternative example, after selecting a task for the actionable task list, to parse a string into discrete address fields, which includes a name field, the interface 300A might suggest a new task in the task suggestion field. The newly suggested task might be for normalizing names in the name field, based on the correlation of task attributes in the previously selected task for parsing the data into a set of fields that include names and attributes associated with the new task for normalizing names values.

The list of suggested tasks can also be based, at least in part, on the identification of outliers in the data set during the analysis of the data set. For instance, analysis of the data set may reveal misspellings, in the data set, based on a consultation of a dictionary or list of terms. For example, if the data set included a list of companies in data set B 120, the new task looks for misspellings of a company name, "Microsoft," based on a white list of company names or a search index of known companies. The search may also simply identify stand-alone terms that do not have any other matches in the data set or any related mappings by the storage system for the term/company. Then, the system can (based on this context, which includes a detected data set attribute of multiple variations of a common term in a particular data range) provide appropriate suggestions to fix the error, based on identifying tasks having attributes for consolidating terms that are presented in different formats. As an example, if one or more rows had a misspelling of "Microsoft", the new task could suggest fixing this to a normalized value of "Microsoft".

In some embodiments, the detected context used to identify the suggested tasks is based in part based on the method and/or location used for receiving the user input that is operable to trigger the display of the task control user interface tool. For example, referring to FIG. 1, the suggested tasks would be different based on the user selecting the first stream 130 and the user selecting the rows from the third stream 150.

As an example and referring to the Sankey diagram 100 in FIG. 1A or FIG. 2A, the user could double-click on the first stream 130 and the system would present one or more tasks that can be taken to create more matches between the data set. The user could initiate this action in several ways including double-clicking, right-clicking, a press-and-hold, gaze detection, a menu option selection, etc. In some cases, the suggested tasks may be based on multiple factors, including any of the foregoing context factors or any other factors that determined to be associated with the data and the stored tasks.

By way of example, if a user is working from a Sankey diagram 100 that visually represents the number of rows that are successfully joined and not joined, a first factor may be whether there are anomalies that prevent the rows from being joined. A second factor could also be whether the user selected the first stream 130 that represents rows from data set A 110 that did not join with data set B 120. The system can analyze which data elements can be changed to reduce the data abnormalities. In this example, due to the context provided by the data being represented and the users input, the system may identify some corrective actions associated with improving the join, which may require a change to data in data set A or data set B, but may refrain from presenting any identified corrective actions that would require a change to the data in data set A 110, since the context of selecting data set A 110 shows a preference for data in data set A 110.

In some embodiments, the detected context comprises a detected type of data in the data set. For example, if the character format of a record looks similar to a number but is not formatted properly (e.g., being formatted as a textual character type, as detected by the data attribute analyzer, whereas the data type associated with the name value for the column of records indicates that values should be integers or wherein all other data entries are integers), a suggested task could be identified based on a correlation to a task attribute associated with a data transform for reformatting the data to the expected format/type. As an alternative example, if a data record expects a first and last name separately (based on tagged annotations for the data) and finds one of these fields null and the other field has a two-part name, for example "Mindy McConnell", the task could suggest separating the data entry with "Mindy" as the first name field and "McConnell" as the last name.

In some embodiments, the detected context is based in part on the location of the data in the data set. For example, if the fields first name and last name are located next to each other in a data set and a field delimiter, for example a pipe or semicolon, is missing so that the first name field is "Mindy McConnell" and the last name field is blank or null. Based on this context, the new task would suggest that the records should be spilt with "Mindy" as the first name and "McConnell" as the last name.

Some embodiments further include parsing the textual user input into parsed textual input and finding one or more tasks from a task repository that corresponds to the parsed text. For example, a user could provide "clean business_id so it joins" as the textual user input. In this example, terms would be parsed and associated to actions in a task repository (e.g., table or other data structure). In this example, the textual input could be associated to suggest an action to normalize the data field "business_id" based on the identified and parsed data field "business_id" and the terms "clean" and/or "join."

Some embodiments further include presenting at least two sequential tasks of the selectable tasks according to dependency restrictions that are associated with an intended sequential order of operation, as defined by transformation metadata or stored transformation rules. For example, a data field may need to be normalized first and then parsed or combined. For example, the values "Mrs.", "Ms.", "miss", may all be normalized to "Ms.". After the normalizing, the value can be converted to "female". Here, the sequence of tasks may be restricted, or required to be sequential and performed in a particular order. The combination of related or sequential tasks can also be referenced as a task subset by a single identifier in the task suggestion field 330, such that when the identifier is selected, all of the corresponding subsets of tasks are added to the actionable task structure.

It will be appreciated that all of the disclosed embodiments may be implemented with a computer system including one or more processors and computer-readable media such as computer memory that store computer-executable instructions that are operable, when executed by one or more processors, to cause various functions to be performed, such as the acts recited in the disclosed embodiments. Exemplary computing environments are further described below in reference to FIGS. 6 and 7.

Figure 6:
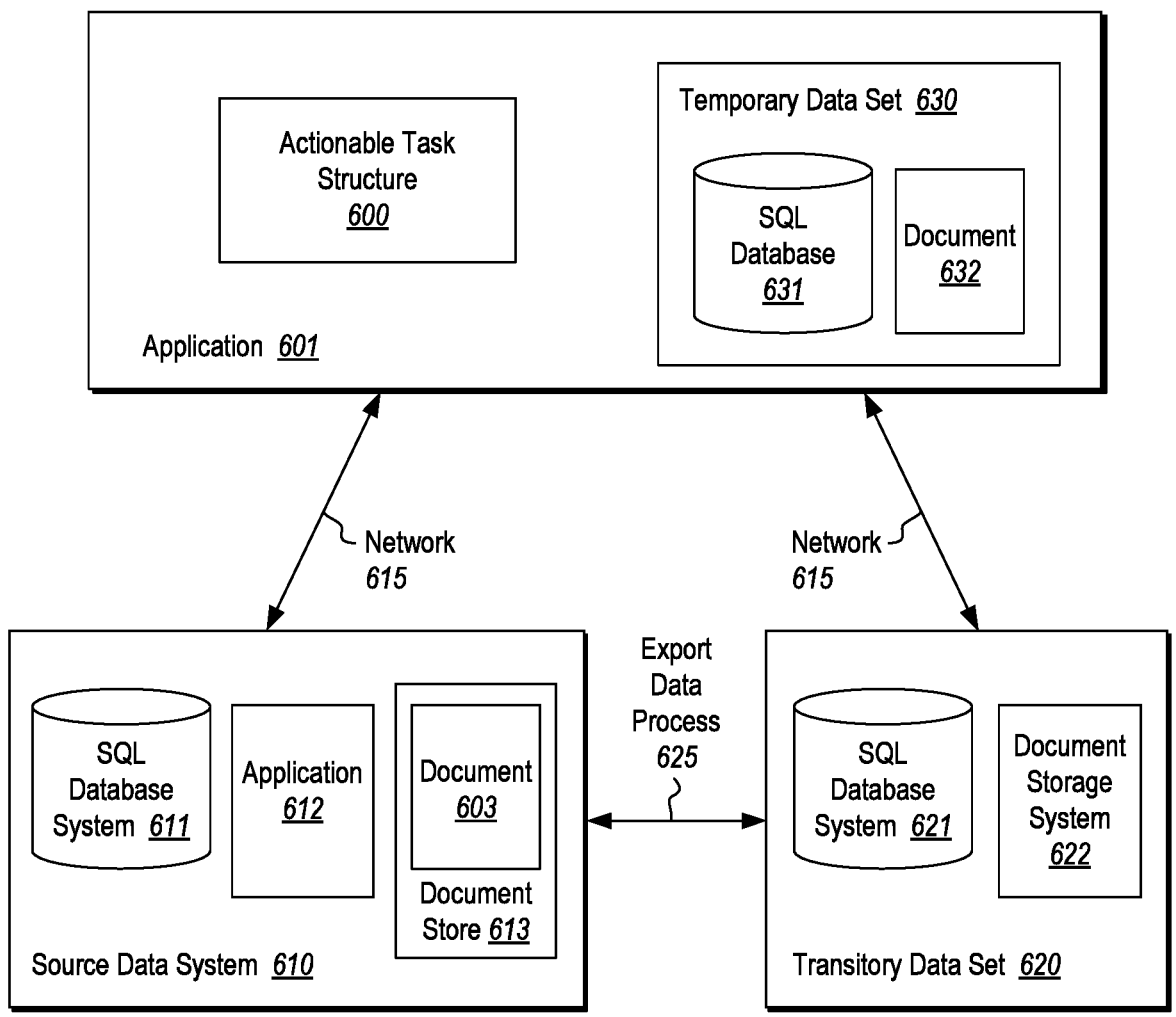
FIG. 6 shows an exemplary computing environment of different data sets that are transformable by an actionable task structure.

FIG. 6 provides an example of different types of data sets that may be used to generate and/or apply the actionable task structure 600. The actionable task structure 600 may be generated by and configured to be executed with data from a source system 610, a transitory data set 620, and/or a temporary data set 630. Data sets can be an entire database, a table in a database, an exported file from a database, a collection of documents or a single document in a document storage system, an XML list, data queried from a web service (e.g. a RESTful API), etc.

In one embodiment, the source system data 610 may be from a SQL database system 611, a data API and/or a computer application 612, and/or a document storage based system 613 comprising one or more files 603. The data transforms of the actionable task structure are capable of operating directly on these types of data sets over a network 615. For example, an actionable task structure may be able to analyze a repository of documents in a document storage based system 613 and transform the data within the documents based on the sequence of tasks. As an example, an address that is tagged as a single data element in the document can be transformed by parsing the address into street address, city, state, and zip code. In this example, the source document will be transformed to the new data format. As an alternate example, a SQL system may store the address as a single data value. In that case, an actionable task structure can execute the necessary database and data manipulation operations to transform the data from a single value to multiple values.

As an alternative embodiment, a transitory data set 620 may be the operable target of the actionable task structure. The transitory data set may exist in a process where data is moved from a first system to a second system. The transitory data set is used to manipulate the data over a network 615 so that is it ready for consumption in the second system. The second system could be a line of business application, a data warehouse, a report, or other system that uses data. In this example, data from one or more source system data 610 may be exported 625 to one or more data formats in the transitory data set 620. The transitory data sets could be a SQL system 621, a document storage system 622, and/or any other format to store data. In this embodiment, the actionable task structure is capable to conduct similar data transformation operations as the previous example.

As an alternative embodiment, the data may be transformed in a temporary data set 630 that is used in an application configured to execute the actionable task structure. In this case, the data may be imported from a source system 610, a transitory data set 620, or a combination of these. The temporary data set 630 may serve as a working copy of the data and the data may be temporarily stored and modified in a SQL database 631 or an unstructured data store, like a document storage system 632. The temporary data set could be used to calculate and model a predicted effect of the sequenced order list by executing the changes and identifying the effect. In this embodiment, the actionable task structure could conduct similar operations as the previous example.

Computing Environments

The disclosed methods may be practiced by a computer system including one or more processors and computer-readable media such as computer memory. In particular, the computer memory may store computer-executable instructions that when executed by one or more processors cause various functions to be performed, such as the acts recited in the embodiments.

Figure 7:
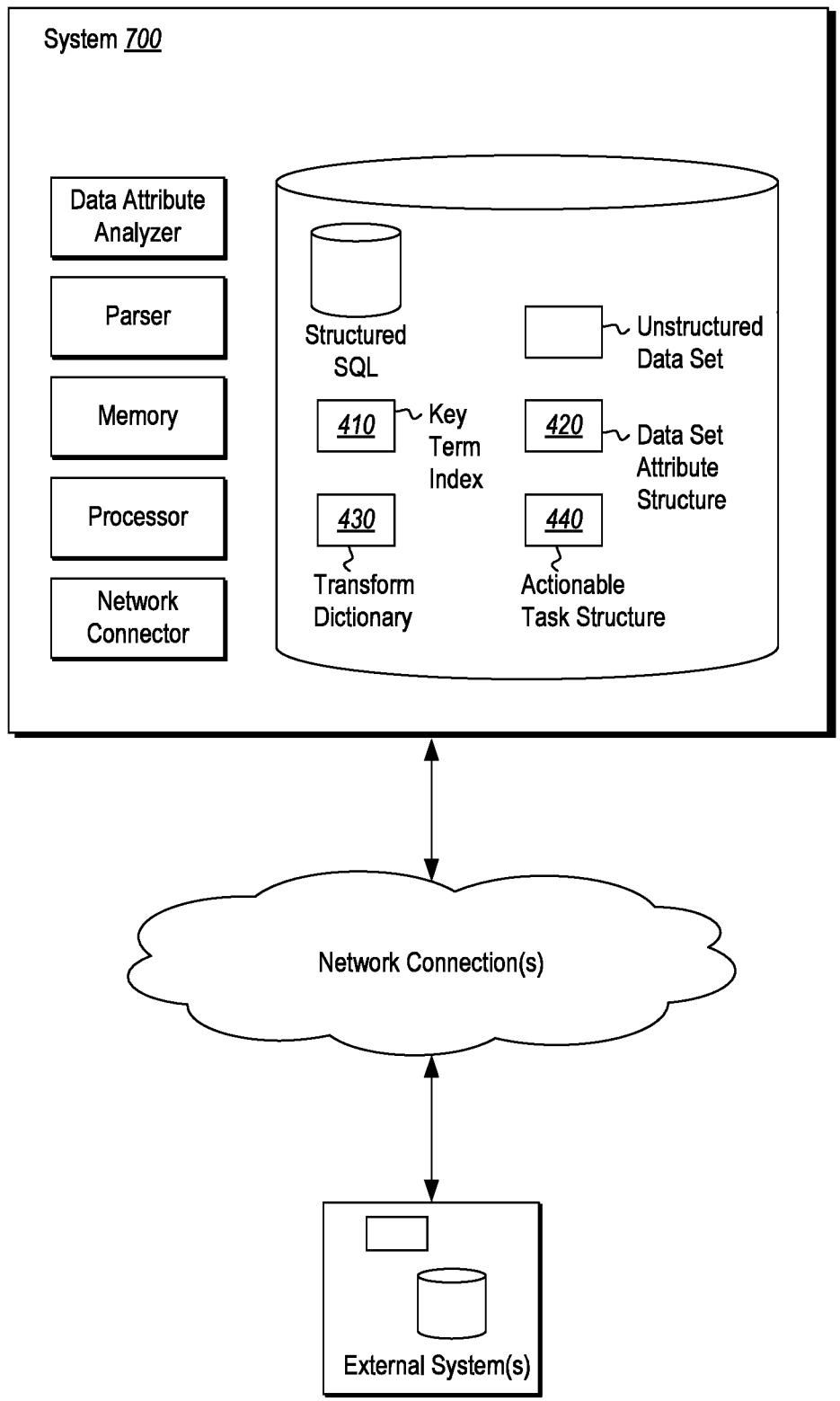
FIG. 7 shows an exemplary computing environment that includes system components which are operable to implement aspects of the disclosed embodiments.

FIG. 7 illustrates a representative computing system 700 for implementing the methods and functionality described above. As shown, the system 700 may include the actionable task structure 440 (which may be stored as executable instructions within the storage of the system). The storage may also store tables and other data structures described above, including the transform dictionary 430, the data set attribute structure 420, the key term index 410 and the structured and/or unstructured data that forms the identified data set, and the computer-executable instructions that are executed by processors of the system 700 to implement the functionality described herein.

The system also includes memory and network connectors that are configured to store, process and communicate the interfaces, actionable tasks structures, other data structures described herein, as well as to help execute the stored executable instructions for implementing the functionality described herein.

The system also includes the data attribute analyzer, described above, which is used to identify attributes of a particular data set and a parser that is used to identify semantic and syntactic terms associated with textual input entered into the annotation field of the disclosed interfaces.

In some instances, the system is a distributed system that is connected to one or more external systems that contain similar, shared and/or different components than those described above to implement the functionality described herein.

The system 700 may be embodied as a special purpose computer including input and output computer hardware, as well as hardware storage and processors, for implementing functionality of the claimed invention. Embodiments within the scope of the present invention may also include combinations of physical and other computer-readable media for carrying or storing computer-executable instructions and/or data structures that are executed by the processors of the system to implement the claimed invention. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computing system comprising:
   one or more processor(s); and
   one or more computer-readable hardware storage device(s) having stored thereon computer-executable instructions that are executable by the one or more processor(s) to cause the computing system to resequence a task list comprising a plurality of tasks that, when executed, transform a data set into a modified data set by causing the computing system to:
   obtain the task list that includes the plurality of tasks, wherein each task in the task list includes (i) a task label, (ii) a data transformation operation, and (iii) metadata that identifies particular data on which the data transformation operation is to be applied, the particular data being included in the data set;
   display the task list, the task list being organized as an ordered listing associated with a particular sequence for executing each of the tasks in the task list, the task labels also being displayed as a result of the task list being displayed;
   for each respective task label that is displayed, display a corresponding visual identifier simultaneously with each respective task label such that a list of visual identifiers is displayed simultaneously with the task list,
      wherein each visual identifier in the list of visual identifiers displays an operational compatibility as between (i) a corresponding task of each visual identifier and (ii) either a previous task that is previously-listed in the task list relative to said corresponding task or, alternatively, a subsequent task that is subsequently-listed in the task list relative to said corresponding task;
   display a set of suggested tasks that are each selectable for incorporation into the task list, wherein each respective suggested task in the set of suggested tasks is visually ordered within the set of suggested tasks based on a quantity of records that would be changed in the data set if said each respective suggested task were implemented;
   receive user input that is operable to modify the ordered listing;
   change the ordered listing to create a new ordered listing;
   determine whether the new ordered listing is capable of transforming the data set into the modified data set based at least in part on whether the data transformation operation is compatible with the particular data; and
   render output that indicates whether the new ordered listing is capable of transforming the data set into the modified data set.

2. The computing system of claim 1, wherein determining whether the new ordered listing is capable of transforming the data set into the modified data set includes:
   determining that the new ordered listing is incapable of transforming the data set into the modified data set as a result of a first task in the new ordered listing generating output data that is incompatible to operate as input data for a second task in the new ordered listing, the second task occurring subsequent to the first task in the new ordered listing.

3. The computing system of claim 1, wherein execution of the computer-executable instructions further causes the computing system to:
   visually identify one or more task(s) in the task list that are impacted as a result of the ordered listing being changed.

4. The computing system of claim 1, wherein execution of the computer-executable instructions further causes the computing system to:
   visually identify one or more suggested new task(s) to add to the task list, wherein the one or more suggested new task(s) are identified based on a determination that the one or more suggested new task(s), when applied to the data set, will cause the data set to be transformed into the modified data set.

5. The computing system of claim 1, wherein execution of the computer-executable instructions further causes the computing system to:
   visually identify one or more suggested change(s) to make to one or more task(s) in the task list, wherein the one or more suggested change(s) are identified based on a determination that the one or more suggested change(s), when applied to the one or more task(s) in the task list, will cause the data set to be transformed into the modified data set.

6. The computing system of claim 1, wherein the user input that is operable to modify the ordered listing of tasks in the task list comprises adding a new task to the task list.

7. The computing system of claim 1, wherein the user input that is operable to modify the ordered listing of tasks in the task list comprises deleting a preexisting task from the task list.

8. The computing system of claim 1, wherein the user input that is operable to modify the ordered listing of tasks in the task list comprises changing a sequenced ordering of two or more tasks in the task list.

9. The computing system of claim 1, wherein the metadata identifies a particular type of data that is operable to be transformed by the task.

10. The computing system of claim 1, wherein the metadata identifies a particular location of data that is operable to be transformed by the task.

11. A computer-implemented method for resequencing a task list comprising a plurality of tasks that, when executed, transform a data set into a modified data set, the method comprising:
   obtaining the task list that includes the plurality of tasks, wherein each task in the task list includes (i) a task label, (ii) a data transformation operation, and (iii) metadata that identifies particular data on which the data transformation operation is to be applied, the particular data being included in the data set;
   displaying the task list, the task list being organized as an ordered listing associated with a particular sequence for executing each of the tasks in the task list, the task labels also being displayed as a result of the task list being displayed;
   for each respective task label that is displayed, displaying a corresponding visual identifier simultaneously with each respective task label such that a list of visual identifiers is displayed simultaneously with the task list,
      wherein each visual identifier in the list of visual identifiers displays an operational compatibility as between (i) a corresponding task of each visual identifier and (ii) either a previous task that is previously-listed in the task list relative to said corresponding task or, alternatively, a subsequent task that is subsequently-listed in the task list relative to said corresponding task;

displaying a set of suggested tasks that are each selectable for incorporation into the task list, wherein each respective suggested task in the set of suggested tasks is visually ordered within the set of suggested tasks based on a quantity of records that would be changed in the data set if said each respective suggested task were implemented;

receiving user input that is operable to modify the ordered listing;

changing the ordered listing to create a new ordered listing;

determining whether the new ordered listing is capable of transforming the data set into the modified data set based at least in part on whether the data transformation operation is compatible with the particular data; and rendering output that indicates whether the new ordered listing is capable of transforming the data set into the modified data set.

12. The method of claim 11, wherein determining whether the new ordered listing is capable of transforming the data set into the modified data set includes:

determining that the new ordered listing is incapable of transforming the data set into the modified data set as a result of a first task in the new ordered listing generating output data that is incompatible to operate as input data for a second task in the new ordered listing, the second task occurring subsequent to the first task in the new ordered listing.

13. The method of claim 11, wherein the method further includes visually identifying one or more task(s) in the task list that are impacted as a result of the ordered listing being changed.

14. The method of claim 11, wherein the method further includes visually identifying one or more suggested new task(s) to add to the task list, wherein the one or more suggested new task(s) are identified based on a determination that the one or more suggested new task(s), when applied to the data set, will cause the data set to be transformed into the modified data set.

15. The method of claim 11, wherein the method further includes visually identifying one or more suggested change(s) to make to one or more task(s) in the task list, wherein the one or more suggested change(s) are identified based on a determination that the one or more suggested change(s), when applied to the one or more task(s) in the task list, will cause the data set to be transformed into the modified data set.

16. The method of claim 11, wherein the user input that is operable to modify the ordered listing of tasks in the task list comprises adding a new task to the task list.

17. The method of claim 11, wherein the user input that is operable to modify the ordered listing of tasks in the task list comprises deleting a preexisting task from the task list.

18. The method of claim 11, wherein the user input that is operable to modify the ordered listing of tasks in the task list comprises changing a sequenced ordering of two or more tasks in the task list.

19. The method of claim 11, wherein the metadata identifies a particular type of data that is operable to be transformed by the task.

20. One or more hardware storage device(s) having stored thereon computer-executable instructions that are executable by one or more processor(s) of a computing system to cause the computing system to resequence a task list comprising a plurality of tasks that, when executed, transform a data set into a modified data set by causing the computing system to:

obtain the task list that includes the plurality of tasks, wherein each task in the task list includes (i) a task label, (ii) a data transformation operation, and (iii) metadata that identifies particular data on which the data transformation operation is to be applied, the particular data being included in the data set;

display the task list, the task list being organized as an ordered listing associated with a particular sequence for executing each of the tasks in the task list, the task labels also being displayed as a result of the task list being displayed;

for each respective task label that is displayed, display a corresponding visual identifier simultaneously with each respective task label such that a list of visual identifiers is displayed simultaneously with the task list, wherein each visual identifier in the list of visual identifiers displays an operational compatibility as between (i) a corresponding task of each visual identifier and (ii) either a previous task that is previously-listed in the task list relative to said corresponding task or, alternatively, a subsequent task that is subsequently-listed in the task list relative to said corresponding task;

display a set of suggested tasks that are each selectable for incorporation into the task list, wherein each respective suggested task in the set of suggested tasks is visually ordered within the set of suggested tasks based on a quantity of records that would be changed in the data set if said each respective suggested task were implemented;

receive user input that is operable to modify the ordered listing;

change the ordered listing to create a new ordered listing;

determine whether the new ordered listing is capable of transforming the data set into the modified data set based at least in part on whether the data transformation operation is compatible with the particular data; and render output that indicates whether the new ordered listing is capable of transforming the data set into the modified data set.

* * * * *